(12) United States Patent
Konchan et al.

(10) Patent No.: US 8,196,992 B2
(45) Date of Patent: Jun. 12, 2012

(54) RETRACTING SEAL SURFACE ENABLING INDEPENDENT ACTION OF OPPOSING HINGED VEHICLE DOORS

(75) Inventors: Jeffrey L. Konchan, Romeo, MI (US); James C. O'Kane, Shelby Township, MI (US); Gary W. Krajenke, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 155 days.

(21) Appl. No.: 12/843,339

(22) Filed: Jul. 26, 2010

(65) Prior Publication Data

US 2012/0019023 A1      Jan. 26, 2012

(51) Int. Cl.
*B60J 10/08* (2006.01)

(52) U.S. Cl. .................... 296/146.9; 49/475.1

(58) Field of Classification Search .............. 296/146.9, 296/146.7; 49/314, 475.1, 484.1, 495.1; 277/345, 921
See application file for complete search history.

(56) References Cited

U.S. PATENT DOCUMENTS

| 2,802,247 A * | 8/1957 | Anderson | 49/314 |
| 2009/0227196 A1 * | 9/2009 | McClary | 454/162 |

FOREIGN PATENT DOCUMENTS

| EP | 1221529 A1 * | 7/2002 |
| GB | 2302898 A  * | 2/1997 |

* cited by examiner

*Primary Examiner* — Lori Lyjak
(74) *Attorney, Agent, or Firm* — Quinn Law Group, PLLC

(57) ABSTRACT

A seal module for sealing between a first door and a second door of opposing-hinged doors includes a base defining a channel and a retractable seal moveably disposed within the channel. The retractable seal moves between an extended position for sealing between the first door and the second door, and a retracted position spaced from one of the first door and the second door to allow independent pivotable movement of either the first door or the second door.

20 Claims, 6 Drawing Sheets

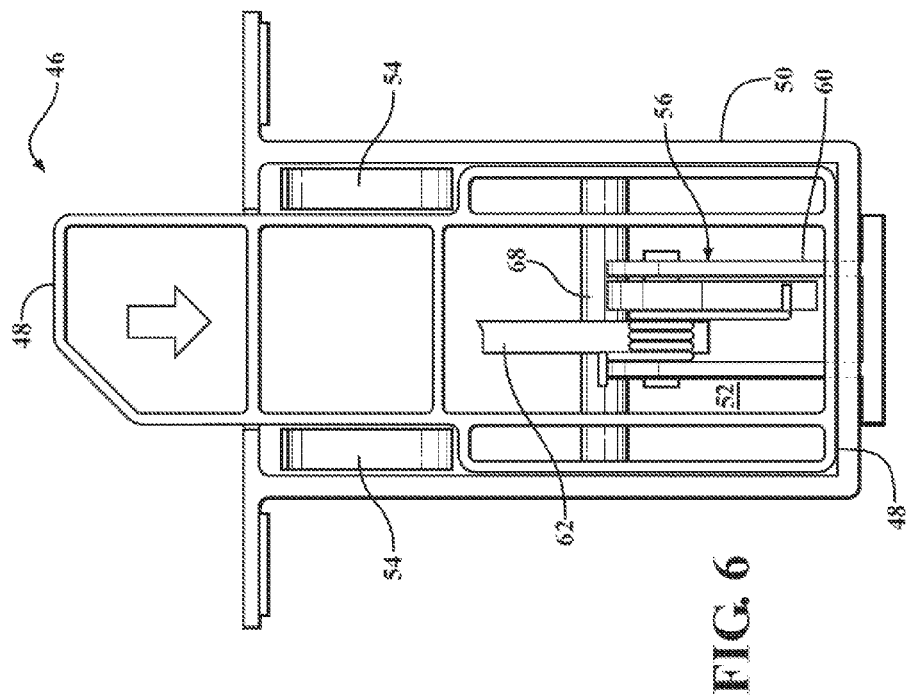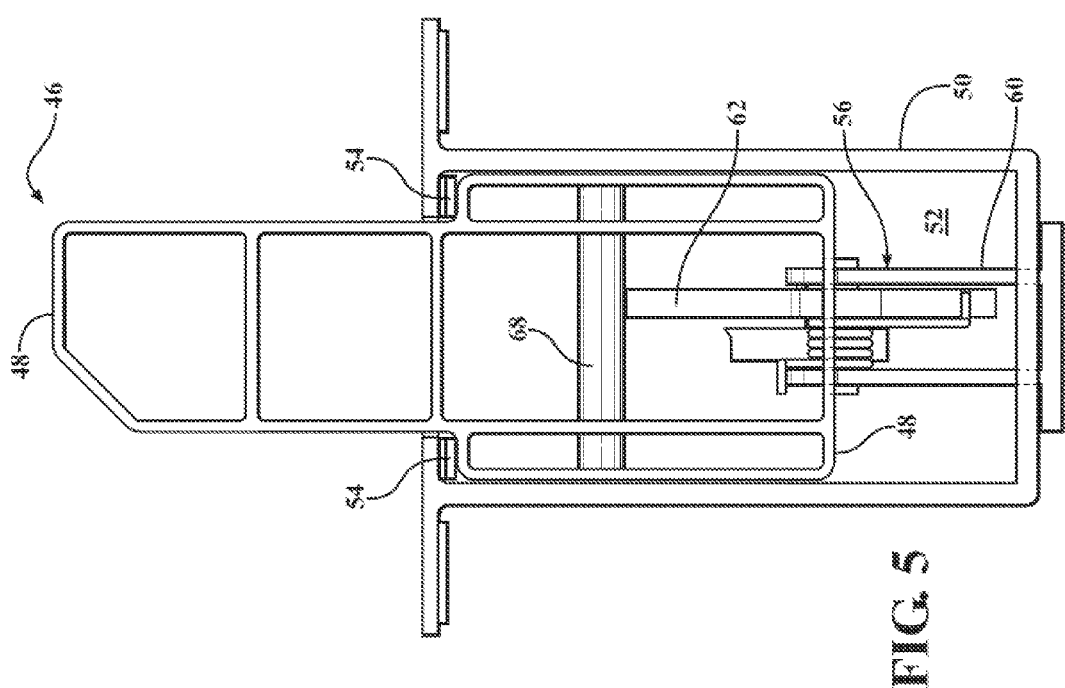

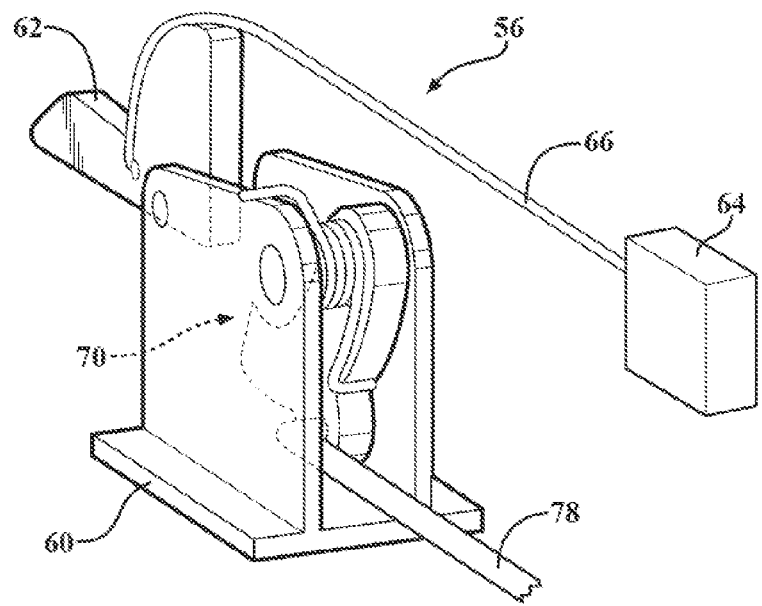
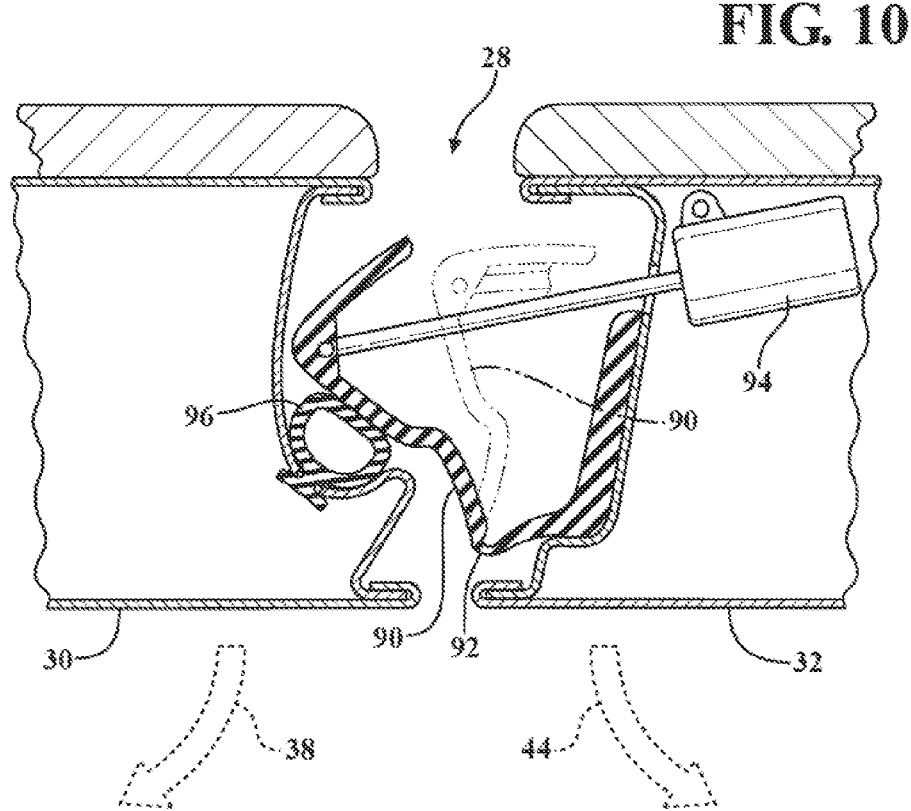

RETRACTING SEAL SURFACE ENABLING INDEPENDENT ACTION OF OPPOSING HINGED VEHICLE DOORS

TECHNICAL FIELD

The invention generally relates to a seal module for sealing between a pair of opposing-hinged doors of a vehicle.

BACKGROUND

Opposing-hinged doors on vehicles include a first door and a second door arranged on the same side of the vehicle, longitudinally adjacent to each other, with the first door disposed nearer a forward end of the vehicle than the second door. Each of the opposing-hinged doors pivots open in an opposite direction. More specifically, the first door includes a forward edge disposed nearer the forward end of the vehicle and a rearward edge disposed nearer a rearward end of the vehicle. The second door also includes a forward edge disposed nearer the forward end of the vehicle and a rearward edge disposed nearer the rearward end of the vehicle. The first door is hinged along the forward edge of the first door, and pivots in a first pivot direction such that the rearward edge of the first door swings away from the vehicle when opening and toward the vehicle when closing the first door. The second door is hinged along the rearward edge of the second door, and pivots open in a second pivot direction, which is opposite the first pivot direction, such that the forward edge of the second door swings away from the vehicle when opening and toward the vehicle when closing the second door. Accordingly, the first door and the second door open in opposite directions.

When the vehicle does not include a body pillar between the first door and the second door to define a continuous opening, the vehicle typically includes a seal disposed between the first door and the second door. The seal is attached to one of the first door and the second door, with the first door and the second door sealing against each other. The first door and the second door are thus, "dependent". That is, one vehicle door, usually the front door, must be opened before the rear door can be opened, and the rear door must then be closed before the front door can be closed. The doors are dependent so that one door can seal to the other door when the doors are closed, because there is no body pillar between the doors that the doors could otherwise seal to and be operated independently.

SUMMARY

A vehicle is provided. The vehicle includes a body, and a pair of opposing-hinged doors mounted to the body. The vehicle further includes a retractable seal mounted to one of the opposing-hinged doors. The retractable seal is moveable between an extended position and a retracted position. The retractable seal is disposed in sealing engagement with each of the opposing-hinged doors when in the extended position to seal between the pair of opposing-hinged doors. The retractable seal is spaced from one of the opposing-hinged doors when in the retracted position to allow independent movement of each of the opposing-hinged doors relative to the other of the opposing-hinged doors.

A seal module for sealing between a pair of opposing-hinged doors of a vehicle is also provided. The seal module includes a base defining a channel, and a retractable seal partially disposed within the channel. The retractable seal is moveable between an extended position that is configured for sealing between the pair of opposing-hinged doors, and a retracted position that is configured for allowing independent movement of each of the opposing-hinged doors relative to the other of the opposing-hinged doors.

Accordingly, the retractable seal moves into the retracted position to not interfere with opening movement of either of the pair of opposing-hinged doors. As such, when the retractable seal is in the retracted position, either of the pair of opposing-hinged doors may be opened independently of the other door.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 5 is a schematic cross sectional view of the seal module in the extended position.

FIG. 6 is a schematic cross sectional view of the seal module in the retracted position.

FIG. 7 is a schematic perspective view of an extending mechanism of the seal module.

FIG. 10 is a schematic cross sectional view of an alternative embodiment of a retractable seal.

DETAILED DESCRIPTION

Referring to the Figures, wherein like numerals indicate like parts throughout the several views, a vehicle is shown generally at 20.

Figure 1:
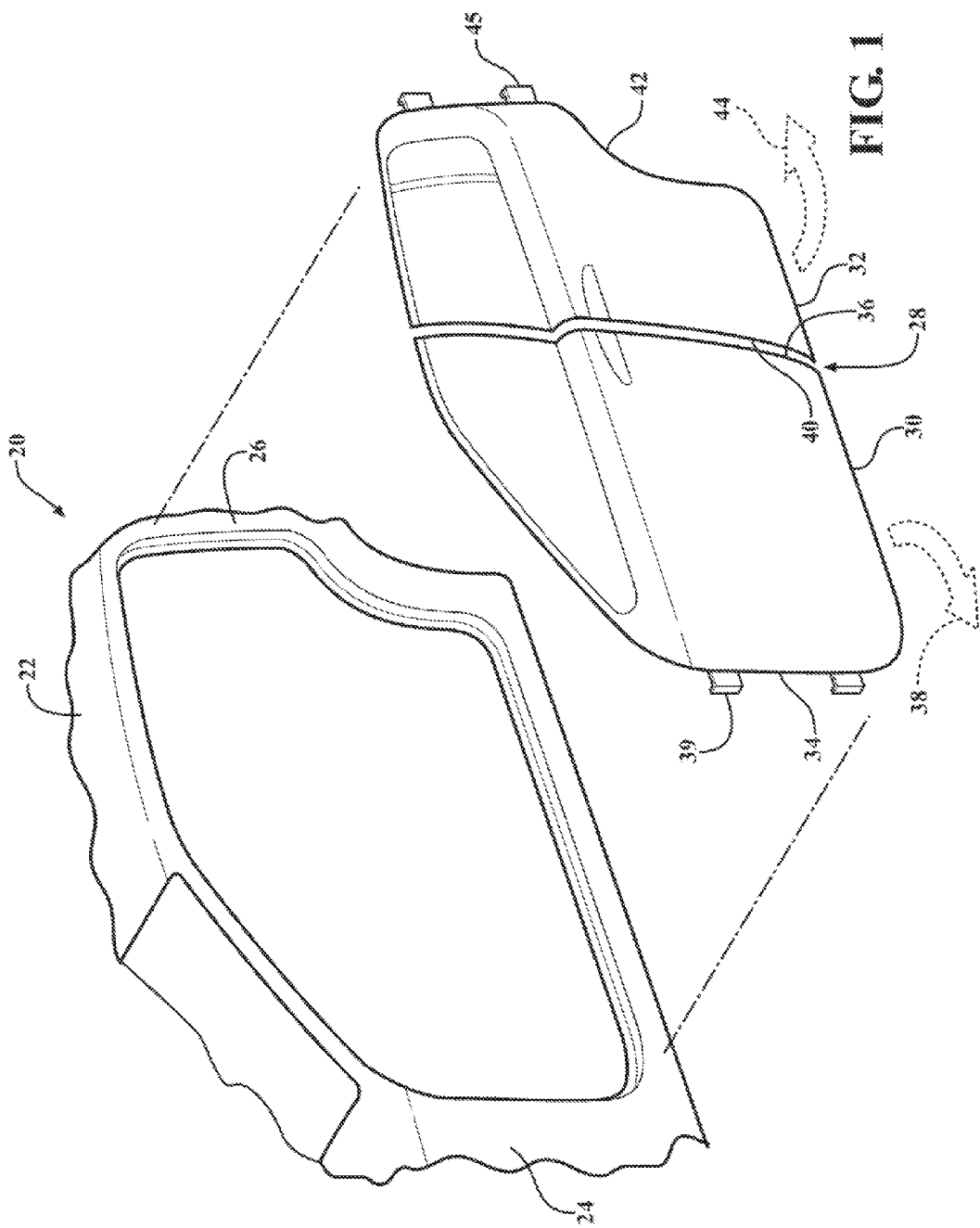
FIG. 1 is a schematic perspective view of a vehicle.

Referring to FIG. 1, the vehicle 20 includes a body 22. The body 22 includes a first end 24 and a second end 26. The second end 26 is disposed opposite the first end 24 along a longitudinal axis of the body 22. The first end 24 of the vehicle 20 may be referred to as, but is not limited to, a front end of the vehicle 20. The second end 26 of the vehicle 20 is may be referred to as, but is not limited to, a rear end of the vehicle 20.

A pair of opposing-hinged doors 28 is mounted to the body 22. The pair of opposing hinged doors 28 may include any pair of opposing-hinged closure panels, including but not limited to, side occupant doors, rear cargo doors, windows, etc. As shown, the opposing-hinged doors 28 are disposed adjacent each other on the same longitudinal side of the body 22, and open in opposite directions, away from each other to provide a continuous, i.e., unobstructed, opening into an interior compartment of the vehicle 20. It should be appreciated that the pair of opposing-hinged doors 28 may be disposed elsewhere on the vehicle 20, for example at the rear end 26 of the vehicle 20. More specifically, the pair of opposing-hinged doors 28 includes a first door 30 and a second door 32. The first door 30 and the second door 32 close against and abut each other when in a closed position, with no body 22 pillar disposed between the first door 30 and the second door 32.

Figure 3:
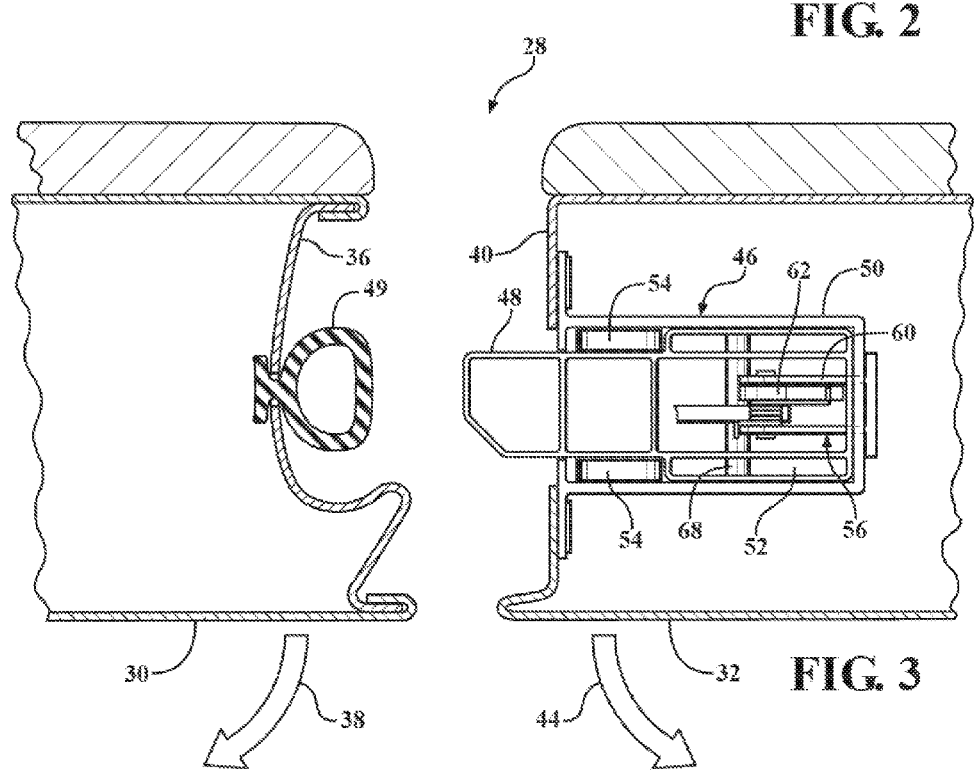
FIG. 3 is a schematic cross sectional view of the vehicle showing the seal module in a retracted position.

The first door 30 may be referred to as, but is not limited to, a front door of the vehicle 20. The first door 30 includes a forward edge 34 disposed toward the first end 24 of the body 22, and a rearward edge 36 disposed toward the second end 26 of the body 22. The first door 30 is pivotable relative to the body 22 in a first pivot direction 38. A first hinge assembly 39 pivotably supports the first door 30 relative to the body 22. The first hinge assembly 39 is disposed adjacent the forward edge 34 of the first door 30 such that the first door 30 is pivotably moveable relative to the body 22 in the first pivot direction 38. As shown in FIGS. 1 and 3, the first pivot direction 38 includes a clockwise direction.

The second door 32 may be referred to as, but is not limited to, a rear door of the vehicle 20. The second door 32 includes a forward edge 40 disposed toward the first end 24 of the body 22, and a rearward edge 42 disposed toward the second end 26 of the body 22. The second door 32 is pivotable relative to the body 22 in a second pivot direction 44. A second hinge assembly 45 pivotably supports the second door 32 relative to the body 22. The second hinge assembly 45 is disposed adjacent the rearward edge 42 of the second door 32 such that the second door 32 is pivotably moveable relative to the body 22 in the second pivot direction 44. The second pivot direction 44 is opposite the first pivot direction 38. As shown in FIGS. 1 and 3, the second pivot direction 44 includes a counterclockwise direction.

The first hinge assembly 39 and the second hinge assembly 45 are "opposing hinges" as the first door 30 and the second door 32 pivot open about the first hinge assembly 39 and the second hinge assembly 45 respectively in opposite directions. The opposing hinges allow for the continuous opening defined by the body 22, with no B-pillar disposed between the first door 30 and the second door 32. The first door 30 and the second door 32 are independently openable and closeable, i.e., may be opened and closed in either order or simultaneously. Because the opening defined by the body 22 is continuous, with no B-pillar between the first door 30 and the second door 32, the first door 30 and the second door 32 define a joint therebetween that should be sealed.

Figure 2:
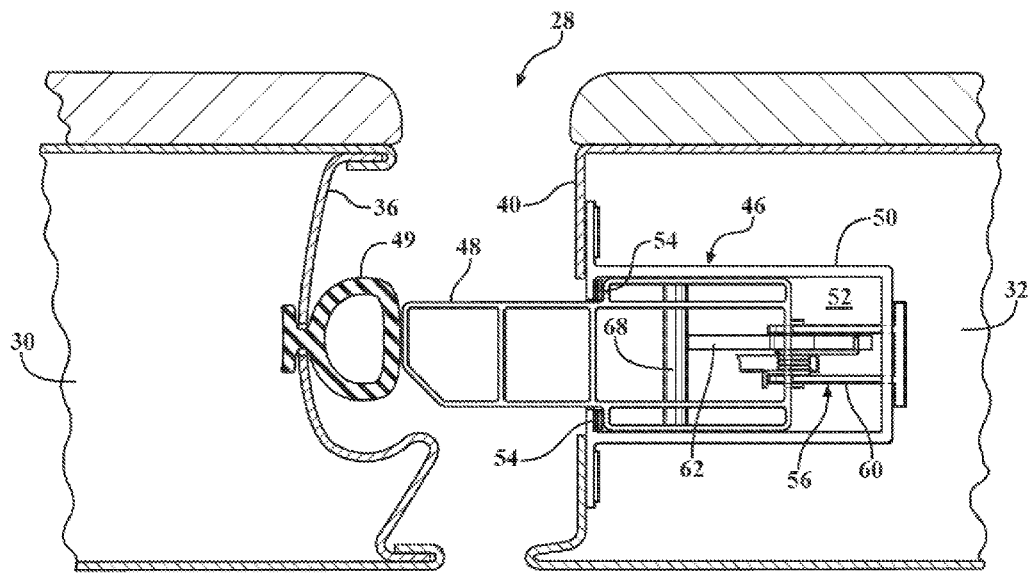
FIG. 2 is a schematic cross sectional view of the vehicle showing a seal module in an extended position.

Referring to FIGS. 2 and 3, the vehicle 20 further includes a seal module 46. The seal module 46 is disposed between the first door 30 and the second door 32 to seal the joint therebetween. More specifically, the seal module 46 includes a retractable seal 48 disposed between the rearward edge 36 of the first door 30 and the forward edge 40 of the second door 32, with the retractable seal 48 moveable into and out of sealing engagement between the first door 30 and the second door 32. The retractable seal 48 provides a sealing surface. The retractable seal 48 may include a hard sealing surface that seals against and mates with a soft sealing surface on the opposing door, or alternatively, the retractable seal 48 may include a soft seal surface attached thereto, which seals against a hard surface on the opposing door. As shown in FIGS. 2 through 9, the retractable seal 48 is disposed on the second door 32, and includes a hard sealing surface, which seals against a weatherstrip 49 disposed on the first door 30.

The seal module 46, and thereby the retractable seal 48, is mounted to one of the opposing-hinged doors 28. The retractable seal 48 is moveable between an extended position and a retracted position. When in the extended position, shown in FIG. 2, the retractable seal 48 is disposed in sealing engagement with each of the opposing-hinged doors 28 to seal between the pair of opposing-hinged doors 28, i.e., the first door 30 and the second door 32. When in the retracted position, shown in FIG. 3, the retractable seal 48 is spaced from one of the opposing-hinged doors 28 to allow independent pivotable movement of each of the opposing-hinged doors 28 relative to the other of the opposing-hinged doors 28. Accordingly, when the retractable seal 48 is disposed in the retracted position, either the first door 30 or the second door 32 may be opened without opening the other of the first door 30 and the second door 32.

The seal module 46 and/or the retractable seal 48 may be configured in any suitable shape and/or configuration capable of selectively sealing between the first door 30 and the second door 32, and moving into the retracted position to permit independent opening and/or closing of either the first door 30 or the second door 32. For example, referring to FIGS. 4 through 6, the seal module 46 includes a base 50 supporting the retractable seal 48. As shown, the base 50 defines a channel 52, which includes a rectangular cross section. The retractable seal 48 is partially disposed within the channel 52. It should be appreciated that the base 50 may be shaped and/or configured in any suitable manner.

The seal module 46 includes a biasing device 54. The biasing device 54 is coupled to the retractable seal 48, and is configured for biasing the retractable seal 48 into one of the extended position and the retracted position. As shown, the biasing device 54 is configured for biasing the retractable seal 48 into the retracted position, shown in FIGS. 4 and 6. More specifically, the biasing device 54 is disposed within the channel 52 of the base 50, and interconnects the base 50 and the retractable seal 48. The biasing device 54 is configured for biasing the retractable seal 48 into the channel 52. The biasing device 54 provides a bias force that urges the retractable seal 48 into the channel 52. As shown, the biasing device 54 includes a pair of wave plate springs disposed on opposite sides of the retractable seal 48, and which extend a length along the seal module 46 and bias against the base 50 and the retractable seal 48. However, it should be appreciated that the biasing device 54 may include any suitable device capable of biasing the retractable seal 48 into the channel 52 and into the retracted position.

Figure 4:
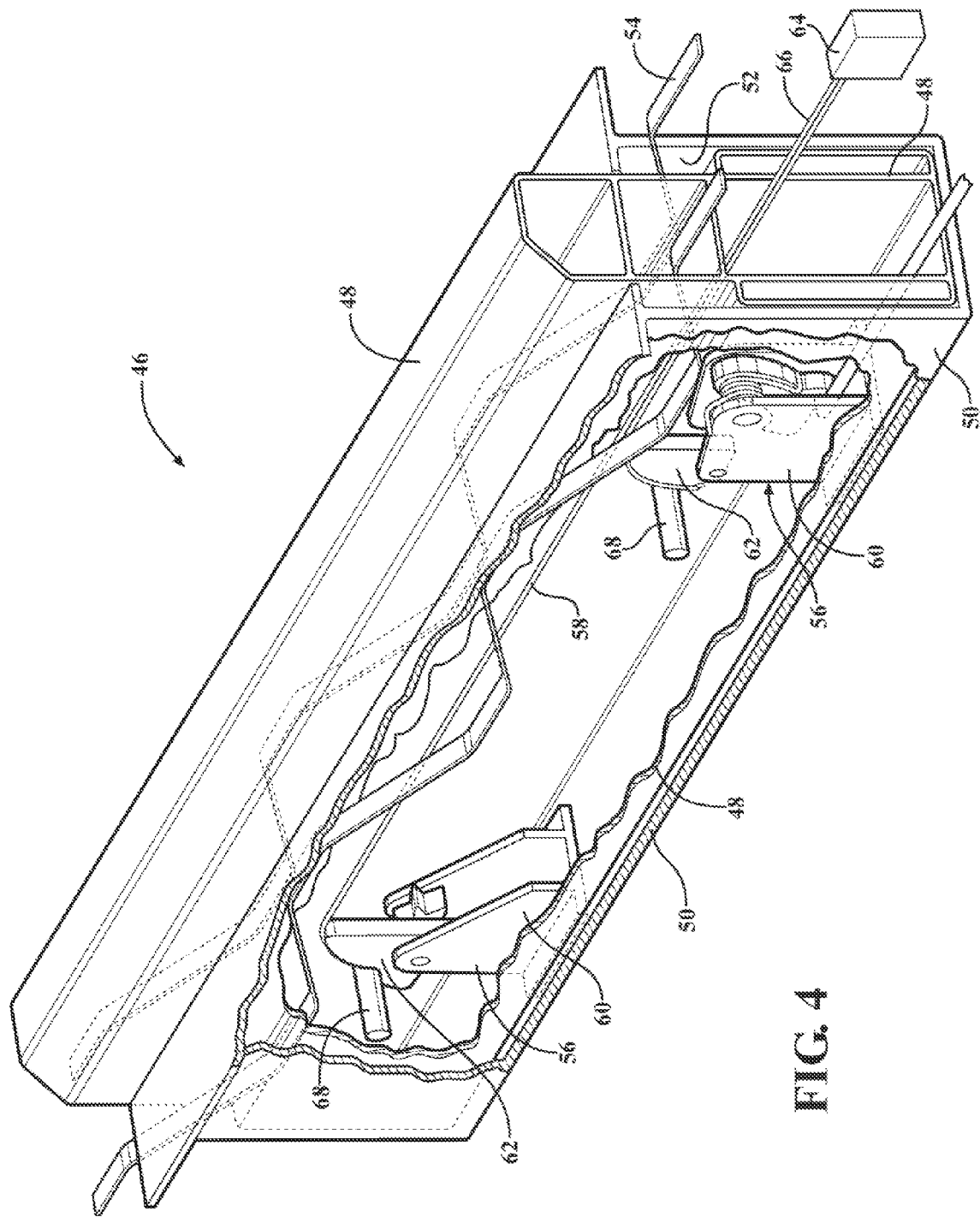
FIG. 4 is a schematic partial cut-away perspective view of the seal module.
Figure 8:
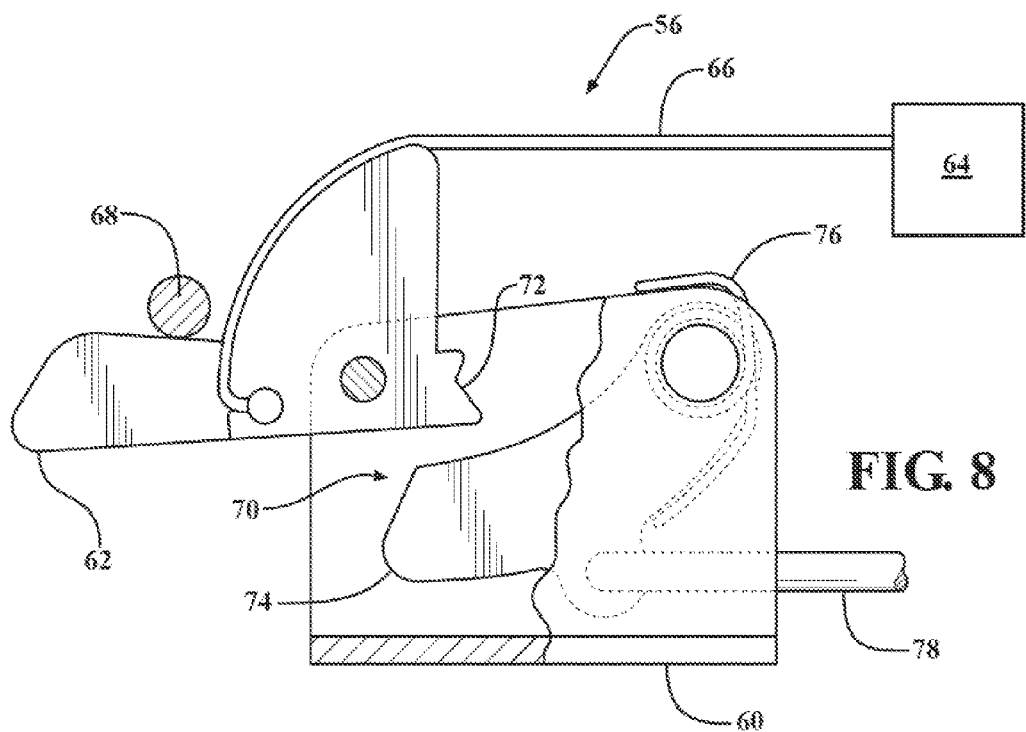
FIG. 8 is a schematic side view of the extending mechanism in a first position.
Figure 9:
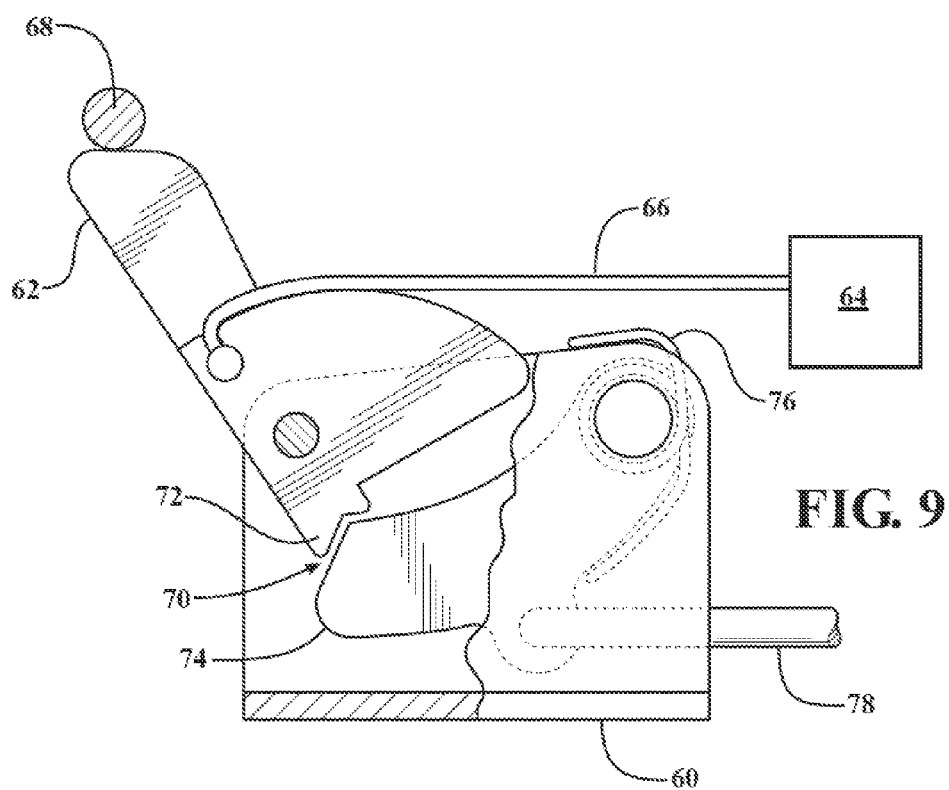
FIG. 9 is a schematic side view of the extending mechanism in a second position.

Referring also to FIGS. 7 through 9, the seal module 46 includes at least one extending mechanism 56. As shown in FIG. 4, the seal module 46 may include multiple extending mechanisms 56 linked together to operate in unison. The multiple extending mechanisms 56 may be linked together through a cable 58 or the like. The extending mechanism 56 is attached to the base 50, and translates the retractable seal 48 between the retracted position and the extended position. Accordingly, the extending mechanism 56 is moveable between a first position, shown in FIG. 8 and a second position, shown in FIG. 9. Movement of the extending mechanism 56 from the first position into the second position moves the retractable seal 48 into the extended position. Similarly, movement of the extending mechanism 56 from the second position into the first position moves the retractable seal 48 into the retracted position.

Referring to FIGS. 7 through 9, the extending mechanism 56 includes a support 60. A cam device 62 is pivotably supported by the support 60. An actuator 64 is coupled to the retractable seal 48. The actuator 64 moves the retractable seal 48 into at least one of the extended position and the retracted position. As shown, the actuator 64 moves the cam device 62 from the first position into the second position, which thereby moves the retractable seal 48 into the extended position. Additionally, the actuator 64 may further move the cam device 62 from the second position into the first position, thereby moving the retractable seal 48 back into the retracted position. As shown, a cable 66 or some other similar connector interconnects the actuator 64 and the cam device 62 of the extending mechanism 56. However, it should be appreciated that the actuator 64 may be disposed directly at the extending mechanism 56, and coupled to the cam device 62 through a gear drive or the like. As shown, the actuator 64 provides a linear motion along a length of the seal module 46, which the cam device 62 converts into a transverse motion to move the retractable seal 48 into and out of the channel 52, transverse to the length of the seal module 46. The actuator 64 may include, but is not limited to, an electric motor or some other similar device.

The retractable seal 48 includes a member 68 in camming engagement with the cam device 62. As shown, the member 68 includes a rod extending transversely across the retractable seal 48. The member 68 engages and moves along the cam device 62, thereby raising and lowering the retractable seal 48, as the cam device 62 moves between the first position and the second position. The cam device 62 may be shaped and/or configured in any suitable manner capable of converting the linear movement provided by the actuator 64 into a transverse movement of the retractable seal 48.

The extending mechanism 56 may include a latch mechanism 70. If the seal module 46 includes multiple extending mechanisms 56, then one or some number less than all of the extending mechanisms 56 may include the latch mechanism 70. The latch mechanism 70 is coupled to the retractable seal 48, and is configured for securing the retractable seal 48 in the extended position. As shown, the latch mechanism 70 includes a detent 72 pivotably coupled to the support 60 of the extending mechanism 56, and a pawl 74 disposed on the cam device 62. The pawl 74 engages the detent 72 in interlocking engagement when the cam device 62 is in the second position to secure the cam device 62 in the second position. The latch mechanism 70 may include a latch biasing device 76 coupled to the detent 72 and configured for biasing the detent 72 into interlocking engagement with the pawl 74. As shown, the latch biasing device 76 includes a coil spring. However, it should be appreciated that the latch biasing device 76 may include some other type of device capable of biasing the detent 72 into interlocking engagement with the pawl 74. The latch mechanism 70 further includes a release device 78, which is coupled to the detent 72. The release device 78 moves the detent 72 out of interlocking engagement with the pawl 74 to allow movement of the cam device 62 into the first position. The release device 78 may include, but is not limited to, a rod or other similar device capable of transmitting linear movement. It should be appreciated that the latch mechanism 70 may include some other mechanism capable of selectively latching the cam device 62 in the second position. Movement of the release device 78 moves the detent 72, which disengages the pawl 74 from the detent 72, to permit movement of the cam device 62.

Referring to FIG. 10, an alternative embodiment of the retractable seal is shown at 90. As shown, the retractable seal 90 is attached to the second door 32, i.e., the rear door, and includes a living hinge 92, about which the retractable seal 90 bends. The retractable seal 90 is generally rigid, except for the area at the living hinge 92, which allows the retractable seal 90 to bend when moving between the extended position and the retracted position. An actuator 94 moves the retractable seal 90 between the extended position and the retracted position. The retracted position is shown in phantom in FIG. 10. The actuator 94 may include any suitable device including but not limited to an electric motor that is capable of providing linear movement to move the retractable seal 90. The actuator 94 may further include any gears and/or linkages necessary to transmit the linear movement and latch the retractable seal 90 in the extended position. The vehicle includes a flexible weatherstrip 96 attached to the first door 30, i.e., the front door. When the retractable seal 90 is in the extended position, the retractable seal 90 is disposed in sealing engagement with the weatherstrip 96.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   a body;
   a pair of opposing-hinged doors mounted to the body; and
   a retractable seal mounted to one of the opposing-hinged doors and moveable between an extended position and a retracted position, wherein the retractable seal is disposed in sealing engagement with each of the opposing-hinged doors when in the extended position to seal between the pair of opposing-hinged doors, and wherein the retractable seal is spaced from one of the opposing-hinged doors when in the retracted position to allow independent movement of each of the opposing-hinged doors relative to the other of the opposing-hinged doors.

2. A vehicle as set forth in claim 1 further including an actuator coupled to the retractable seal and configured for moving the retractable seal into at least one of the extended position and the retracted position.

3. A vehicle as set forth in claim 2 wherein the actuator includes an electric motor.

4. A vehicle as set forth in claim 2 further comprising a biasing device coupled to the retractable seal and configured for biasing the retractable seal into one of the extended position and the retracted position.

5. A vehicle as set forth in claim 4 further comprising a latch mechanism coupled to the retractable seal and configured for securing the retractable seal in the extended position.

6. A vehicle as set forth in claim 5 further comprising a seal module, wherein the seal module includes the retractable seal.

7. A vehicle as set forth in claim 6 wherein the seal module includes a base supporting the retractable seal and defining a channel, with the retractable seal partially disposed within the channel.

8. A vehicle as set forth in claim 7 wherein the biasing device is disposed within the channel of the base and interconnects the base and the retractable seal, wherein the biasing device is configured for biasing the retractable seal into the channel.

9. A vehicle as set forth in claim 8 wherein the biasing device includes a wave plate spring.

10. A vehicle as set forth in claim 7 wherein the seal module includes at least one extending mechanism attached to the base, wherein the extending mechanism is moveable between a first position and a second position, wherein movement of the extending mechanism into the second position moves the retractable seal into the extended position, and movement of the extending mechanism into the first position moves the retractable seal into the retracted position.

11. A vehicle as set forth in claim 10 wherein the at least one extending mechanism includes a support pivotably supporting a cam device, with the actuator coupled to the cam device and configured for moving the cam device from the first position into the second position.

12. A vehicle as set forth in claim 11 wherein the retractable seal includes a member in camming engagement with the cam device.

13. A vehicle as set forth in claim 11 wherein the latch mechanism includes a detent pivotably coupled to the support of the extending mechanism, and a pawl disposed on the cam device, with the pawl engaging the detent in interlocking engagement when the cam device is in the second position to secure the cam device in the second position.

14. A vehicle as set forth in claim 13 wherein the latch mechanism includes a biasing device coupled to the detent and configured for biasing the detent into interlocking engagement with the pawl.

15. A vehicle as set forth in claim 13 wherein the latch mechanism includes a release device coupled to the detent for moving the detent out of interlocking engagement with the pawl to allow movement of the cam device into the first position.

16. A vehicle as set forth in claim 1 wherein:
the pair of opposing-hinged doors includes a first door pivotable relative to the body in a first pivot direction and a second door pivotable relative to the body in a second pivot direction;
the second door is disposed adjacent the first door, and the second pivot direction is opposite the first pivot direction;
the body includes a first end and a second end, with the second end disposed opposite the first end along a longitudinal axis of the body;
the first door includes a forward edge disposed toward the first end of the body and a rearward edge disposed toward the second end of the body;
the second door includes a forward edge disposed toward the first end of the body and a rearward edge disposed toward the second end of the body; and
wherein the retractable seal is disposed between the rearward edge of the first door and the forward edge of the second door.

17. A vehicle as set forth in claim 2 wherein the retractable seal includes a living hinge, with the actuator coupled to the living hinge and configured for pivoting a portion of the retractable seal about the living hinge between the extended position and the retracted position.

18. A seal module for sealing between a pair of opposing-hinged doors of a vehicle, the seal module comprising:
a base defining a channel;
a retractable seal partially disposed within the channel and moveable between an extended position configured for sealing between the pair of opposing-hinged doors and a retracted position configured for allowing independent pivotable movement of each of the opposing-hinged doors relative to the other of the opposing-hinged doors.

19. A seal module as set forth in claim 18 further comprising at least one extending mechanism attached to the base and including a cam device moveable between a first position and a second position, wherein movement of the cam device into the second position moves the retractable seal into the extended position, and movement of the cam device into the first position moves the retractable seal into the retracted position.

20. A seal module as set forth in claim 19 further comprising a biasing device interconnecting the base and the retractable seal to bias the retractable seal into the retracted position.

* * * * *